(12) United States Patent
Biebach et al.

(10) Patent No.: US 11,040,761 B2
(45) Date of Patent: Jun. 22, 2021

(54) SYSTEM FOR OPERATING A BOAT EQUIPPED WITH AN ELECTRIC DRIVE

(71) Applicant: Torqeedo GmbH, Gilching (DE)

(72) Inventors: Jens Biebach, Tutzing (DE); Philipp Krieger, Finning (DE)

(73) Assignee: Torqeedo GmbH, Gilching (DE)

( * ) Notice: Subject to any disclaimer, the term of this patent is extended or adjusted under 35 U.S.C. 154(b) by 130 days.

(21) Appl. No.: 15/811,516

(22) Filed: Nov. 13, 2017

(65) Prior Publication Data

US 2018/0134361 A1 May 17, 2018

(30) Foreign Application Priority Data

Nov. 14, 2016 (DE) .................... 10 2016 121 818.9

(51) Int. Cl.
| | |
|---|---|
| *B63H 21/21* | (2006.01) |
| *B63H 21/17* | (2006.01) |
| *B60L 3/12* | (2006.01) |
| *B60L 3/00* | (2019.01) |
| *B60L 50/16* | (2019.01) |
| *B60L 50/61* | (2019.01) |

(52) U.S. Cl.
CPC ............... *B63H 21/17* (2013.01); *B60L 3/00* (2013.01); *B60L 3/12* (2013.01); *B60L 50/16* (2019.02); *B60L 50/61* (2019.02); *B60L 2200/32* (2013.01); *B63H 21/21* (2013.01); *Y02T 10/7072* (2013.01); *Y02T 10/72* (2013.01); *Y02T 70/5236* (2013.01)

(58) Field of Classification Search
CPC ............................... B63H 21/17; B63H 21/21
See application file for complete search history.

(56) References Cited

U.S. PATENT DOCUMENTS

| | | | |
|---|---|---|---|
| 8,249,764 B2 | 8/2012 | Bauer et al. | |
| 2004/0173690 A1 | 9/2004 | Takusagawa | |
| 2008/0269969 A1 | 10/2008 | Bauer et al. | |
| 2010/0125383 A1 | 5/2010 | Caouette | |
| 2011/0104962 A1* | 5/2011 | Krause | B60W 10/24 440/2 |
| 2011/0195618 A1 | 8/2011 | Arbuckle et al. | |

FOREIGN PATENT DOCUMENTS

| | | |
|---|---|---|
| DE | 103 07 698 A1 | 9/2004 |
| DE | 103 59 875 A1 | 7/2005 |
| DE | 20 2009 015 027 U1 | 3/2010 |
| EP | 0 223 100 A2 | 5/1987 |

(Continued)

OTHER PUBLICATIONS

Japanese Office Action issued in Japanese counterpart application No. 2017-218986 dated Jan. 8, 2019, with partial English translation (Seven (7) pages).

(Continued)

*Primary Examiner* — Andrew Polay
(74) *Attorney, Agent, or Firm* — Crowell & Moring LLP

(57) ABSTRACT

A system for operating a boat equipped with an electric drive includes a component controller. The component controller includes a component interface for connecting a system component of the electric drive, and a communication interface for connecting the component controller to a system bus of the drive control.

18 Claims, 6 Drawing Sheets

(56) References Cited

FOREIGN PATENT DOCUMENTS

| | | |
|---|---|---|
| EP | 2 330 030 A2 | 6/2011 |
| JP | 57-101901 A | 6/1982 |
| JP | 2002-39604 A | 2/2002 |
| JP | 2008-529866 A | 8/2008 |
| JP | 2012-57934 A | 3/2012 |
| JP | 2013-182392 A | 9/2013 |

OTHER PUBLICATIONS

European Search Report issued in European counterpart application N. 17201556.2-1205 dated Apr. 10, 2018, with Statement of Relevancy (Ten (10) pages).
German Office Action issued in German counterpart application No. 10 2016 121 818.9 dated Aug. 17, 2017 (Five (5) pages).

* cited by examiner

SYSTEM FOR OPERATING A BOAT EQUIPPED WITH AN ELECTRIC DRIVE

CROSS REFERENCE TO RELATED APPLICATIONS

This application claims priority to German Patent Application No. DE 10 2016 121 818.9, filed Nov. 14, 2016, the disclosure of which is expressly incorporated by reference herein.

FIELD OF THE INVENTION

The present invention relates to a system for operating a boat equipped with an electric drive, preferably a boat equipped with one or more electric motors and/or a boat equipped with a hybrid drive comprising at least one internal combustion engine and at least one electric motor.

BACKGROUND OF THE INVENTION

It is known to power boats with an electric drive and, in this regard, fundamentally different installation types for the electric motor are known. Furthermore, in addition to the installation types of an electric motor which are known in the domain of internal combustion engines, directly on the shaft system of the propeller shaft in the interior of the boat or the installation of the electric motor in the interior of the boat on a Z-drive or a sail drive, installation types are also known in which the electric motor is arranged outside the hull of the boat, for example, in the form of outboard engines or under the hull in a drive gondola or pod drives provided on the rudder system.

In order to supply the electric motor of a boat drive with electrical energy, it is known to provide corresponding battery banks in the boat. The batteries of the battery banks can be charged, for example, by means of a charging device which is connected to a shore connection, provided the boat is in the region of a shore connection—that is, typically in a port. For this purpose, a charging device is normally provided in the boat, by means of which a controlled charging of the batteries of the battery banks can be achieved. Herein, the charging device can either be provided on the boat itself—this is then referred to as AC charging, or the charging device can be on land and the boat is supplied directly with a direct current—this is then referred to as DC charging.

In a hybrid system which, aside from the drive by means of the electric motor, also has an internal combustion engine, in principle two different variants are known.

In a first variant, the electric motor and the internal combustion engine act together on the shaft system of the boat, so that optionally an individual or a simultaneous driving of the propeller is possible via the internal combustion engine and/or the electric motor. The two drives are coupleable into the shaft system by means of corresponding transmissions. Both the electric motor and the internal combustion engine can accordingly act simultaneously or one after the other, via the transmissions, on the shaft system and thereby on the propeller.

In a second variant, only the electric motor has an effect on the propeller and the internal combustion engine is coupled to a generator which undertakes the supply of the electric motor and the charging of the batteries of the battery banks. Thus the batteries of the battery banks can also be charged when the boat is not in the region of a shore power connection. In this variant, an energy supply to the electric motor which is used for travelling can be carried out either by means of the battery banks or by means of an operation of the generator simultaneously with the electric motor.

It is further known also to charge the batteries of the battery bank by means of regenerative energy converters provided on the boat, for example, by means of solar cells which are arranged, for example, on a roof of the boat, or by means of a wind generator which is provided on the boat.

The system provided for operating the electric drive can be used, apart from the supply of the actual electric drive, also for supplying other consumers on board, for example, for supplying communications devices, lights and other consumers on the boat which are not directly linked to the electric drive.

A corresponding system is known, for example, from EP 2 330 030 A2.

In the known systems, it is required that a central system control, such as is known for example from the cited prior art, is individually adapted to the respective components of the system. Accordingly, a simple exchange of system components cannot be carried out, but a renewed programming must always be carried out in order in this way to provide anew a function of the system after a component exchange or a defect.

SUMMARY OF THE INVENTION

It is an object of the present invention to provide a system for operating a boat equipped with an electric drive which provides a simplified design and increased reliability.

A system with a simplified design and increased reliability is provided through a system having features of embodiments disclosed herein.

A system for operating a boat equipped with an electric drive comprises a component controller which comprises a component interface which is configured to connect a system component of the electric drive and a communication interface which is configured to connect the component controller to a system bus of a drive control.

In that the component controller comprises a component interface for connecting a system component of the electric drive and a communication interface for connecting the component controller to a system bus, the component controller effectively functions as an intermediate member between the specific physical system components which can be, for example, a battery, an electric motor, a generator, a converter or an internal combustion engine drive, and the system bus.

Thus, the specific system components are in communication with the system bus of the drive control only via the component controller, whereas a direct communication of the system components with the system bus does not take place. Thus, the system bus of the drive control can be configured clearly defined, robust and reliable. An adaptation of the system bus on an exchange of system components is correspondingly not necessary. The respective component controller connected to the system components is connected therebetween and, in each case, assumes the translation and preparation of the signals, states and data communication of the specific system components for the system bus. Furthermore, a decoupling of the system components from the system bus takes place so that defects in individual system components cannot disrupt the system bus.

The system for operating a boat equipped with an electric motor should be understood, in particular, as one which comprises and puts into relation with one another system components necessary at least for the driving of the boat. For the driving of a boat equipped with an electric motor, apart from the actual drive comprising the electric motor with a propeller or a jet drive, an energy supply for the electric motor is also provided which can be provided in the form of a battery, but also in the form of a generator. Such a system further comprises an input unit for defining a desired drive level by the operator of the system.

Apart from the aforementioned system components that are necessary for the actual driving, a system for operating a boat equipped with an electric motor can also comprise further auxiliary system components, such as charging devices for charging a battery, DC/DC converters, DC/AC converters, generators and a plurality of auxiliary consumers such as communication devices, navigation lights, navigation devices, entertainment devices, illumination, kitchen appliances, cooling devices, etc.

Particularly preferably, the component controller comprises an abstraction module by means of which a specific component of the electric drive connected to the system interface is represented on the communication interface as a generic system component.

By means of the abstraction module, the component controller enables the respective specific system components to be abstracted to a generic level, so that the system component can easily be detected, addressed and controlled by a higher-level drive control or system control.

A generic system component should be understood as such which comprises the control and state parameters necessary for operating the system as well as data communication and/or control commands in a general form without having to take account of the specific technical parameters of the connected system component.

For example, in the case of a battery or battery bank, a switch-on signal for the system start may be necessary as a control parameter. On the generic components, only the command "Switch On" is present—the component-specific implementation is then undertaken by the component controller on the basis of the specific properties of the battery or battery bank connected via the component interface. If the command is received accordingly at the communication interface via the system bus to switch on the battery bank on a system start, then the component controller converts this command, dependent upon the battery connected to the component interface in that with a first battery type, for example, a 12 V ignition signal is transferred, with a second battery type, a 24 V ignition signal is transferred and with a third battery type, a pulse is transferred to switch a load relay.

As a state parameter, for example, a charging state can be transferred from the battery to the component controller which then provides at the communication interface, for example abstracted, a percentage charging state or an actual residual capacity.

Thus, all the system components of one system component type connected to the component controller behave equally. In other words, at the communication interface, a generic battery is always displayed and addressed the same, regardless of the actual technical manifestation of the battery.

As a further example, an electric motor can be provided with which as a generic electric motor, for example, only one drive level can be transferred as a drive command. Accordingly, the drive command, e.g. "Half ahead", "Full ahead", "Full reverse" or a percentage drive command, e.g. "80% ahead", "20% reverse", is transferred from a higher-order drive control via the system bus, said command then being converted in the component controller into a corresponding rotary speed stipulation, torque stipulation or power stipulation for the specific electric motor connected to the component interface and being converted into a control command according to the respective power electronics connected to the component interface.

In the case of an electric motor, for example, state parameters such as the temperature, preferably a percentage temperature relative to a maximum temperature permissible for the specific electric motor connected via the component interface are also transferred at the communication interface. A higher-order drive control can correspondingly read out the current percentage temperature loading, regardless of the absolute thermal loading capacity of the specific electric motor.

In other words, a higher-order control system which communicates with the component controller via the system bus can address a system component connected to the component controller via the component interface directly and generally without having to take account of technical peculiarities or particular specifications of the specific system components. Equally, the higher-order control system only receives state parameters and data communication in a generic format.

Accordingly, even on an exchange of system components—for example, the installation of a more powerful motor or the exchange of the battery bank for a battery bank with greater capacity—no change need be made to the higher-order control system and the overall system can be constructed as easy to maintain and scalable.

Preferably, at least two different system components can be alternatively connectable to a single component interface and the component controller can be configurable, dependent upon the system component connected, such that the respective specific system component connected is represented as a generic system component.

Thus, system components, for example, a battery or an electric motor can be connected alternatively to one component controller. In other words, if a battery is connected to the component interface of the component controller, a generic battery can be represented at the communication interface and if, in place of the battery, an electric motor is connected to the component interface of the same component controller, a generic electric motor can be represented at the communication interface. Thus, by means of a single of type of component controller, depending on the system component connected to the communication interface, in each case a corresponding generic system component can be represented and it is not necessary to provide a specific component controller for each type of system component. Only the component controller is adapted to the specific system component connected thereto in that the corresponding parameters are updated. In other words, an initialization of the component controller takes place in that the component controller is adapted to the respective system component connected to the component interface—by means of a corresponding parameterization and/or by means of the use of corresponding conversion tables for the data communication and/or by means of a corresponding internal wiring.

Thus, the possibility exists in the overall system of the boat to provide identical component controllers for connection to a plurality of different or even all types of system components. Thus, the number of possible identical parts within the system is greater, which also has an advantageous effect on the serviceability and the costs.

In this way, it is also possible to exchange system components and/or component controllers against one another, for example, on occurrence of a defect without having to intervene in the higher-level control system. The system controller further controls the generic components represented by means of the component controller.

In the event of a defect in a component controller on the component interface of which the electric motor is arranged, the electric motor can be disconnected, for example, from the defective component controller and connected to a functioning component controller which is not essential for pure vehicle operation—for example, to a component controller to the component interface of which the charging device of the shore connection is connected. Thus, in an emergency situation at sea, the vehicle operation can accordingly be maintained even with a defective component interface.

In that the component controller can, in principle, be connected to any desired system components, for example, to a battery or to the power electronics of an electric motor of the electric drive or a charging device for charging the battery or a generator for charging the battery and the component controller provided therefore are always identically designed, apart from the simplified configuration of the programming of a higher-order control system, an efficient design of the device can also be provided. Furthermore, in this way, redundancies in the system can be built up such that on failure of a component controller, another component controller can take its place.

In this way, it is possible to maintain the driving function of the boat and thus the maneuvering capability and, in this way, to construct a redundant and secure system.

Preferably, a connection unit controller is provided which communicates with the component controller via the system bus and by means of which the component controller receives drive commands. Particularly preferably, the connection unit controller communicates with an input device, for example, a remote throttle lever to specify a drive level by means of an operator and the connection unit controller controls the predetermined drive level according to one or more component controllers via the system bus in order to achieve the pre-determined drive level.

Preferably, the connection unit controller combines at least two component controllers into an organizational connection unit, in particular as a core system and controls the underlying drive functions.

Preferably, the connection unit controller communicates with a device for specifying a desired drive level, for example, with a remote throttle lever, by means of which, accordingly, the respective drive level of the electric drive is specified. Thus, by means of a direct communication between the remote throttle lever and the connection unit controller, the connection unit controller can control the respective components represented as generic system components by the component controller with regard to the underlying drive functions.

For example, by means of a drive command pre-determined by the user by means of the remote throttle lever and transferred to the connection controller, the connection unit controller can transfer the drive command via the system bus and the communication interface directly to the addressed component controller.

The connection unit controller can accordingly be used, firstly, for the organization of the connection unit and, secondly, for processing the respective drive commands, so that here short reaction times and, in particular, also short system start times can be achieved. Rapid booting up of the system and conversion of a drive command is significant particularly when, during maneuvering of the boat, a rapid reaction is needed, for example, in a suddenly occurring emergency stop situation in which an emergency stop maneuver must be carried out or if other maneuver functions are significant.

It is accordingly possible, without involvement of a system controller or even a whole-boat network, to transfer the drive commands immediately and directly by means of the transfer of the respective drive commands or drive level wishes from the remote throttle lever to the connection unit controller and from this via the internal communication bus within the connection unit to the respective component controllers. Thus, the maneuverability of the boat can be provided rapidly and robustly sustained.

In a preferred development, the system controller is configured by means of a corresponding initialization also to serve as a connection unit controller. Thus, a separate connection unit controller can be dispensed with and the number of identical parts in the system can be further increased.

Preferably, the component controllers and the connection unit controller are structurally integrated into one housing which is designated a connection unit. In the connection unit which accordingly consists of a connection unit controller and a plurality of component controllers, a communication takes place between the communication interface of the component controller and the communication interface of the connection unit controller via a system bus which is provided within the connection unit. A system bus can be, for example, a bus which communicates via a known protocol, for example a CANopen bus or another standardized protocol. However, a proprietary protocol can also be used.

Both each component controller as well as each connection unit controller and also each system controller comprises its own microprocessor by means of which the corresponding applications can be processed and by means of which the communication via the corresponding buses can be handled.

In the system, also, at least two connection units, can each be provided with at least one component controller, a connection unit controller and a system controller and the system controllers of the connection units then communicate with one another wherein one system controller then functions as a master system controller and all the other system controllers are operated as slave system controllers.

In this way, a distributed system can be provided in the boat, wherein, for example, on provision of an electric drive with more than one electric motor, a connection unit is associated with each electric motor and the battery banks associated with each electric motor. A further connection unit can be provided, for example, for a generator spaced apart from the electric motors. The battery banks, when they are arranged spaced from the electric motors associated with them in the boat can also be provided with their own connection unit. By means of the communication of the system controllers of the individual connection units among one another, such a distributed system can also be designed as easily scalable and easily serviceable.

In a particularly preferred embodiment, the component controller is configured to detect, on the basis of the system components connected via the component interface, which system component is actually connected and accordingly to carry out an initialization according to the respective specific system component.

Other objects, advantages and novel features of the present invention will become apparent from the following detailed description, taken in conjunction with the accompanying drawings, which illustrate, by way of example, the principles of one or more preferred embodiments.

DETAILED DESCRIPTION OF THE DRAWINGS

Figure 1:
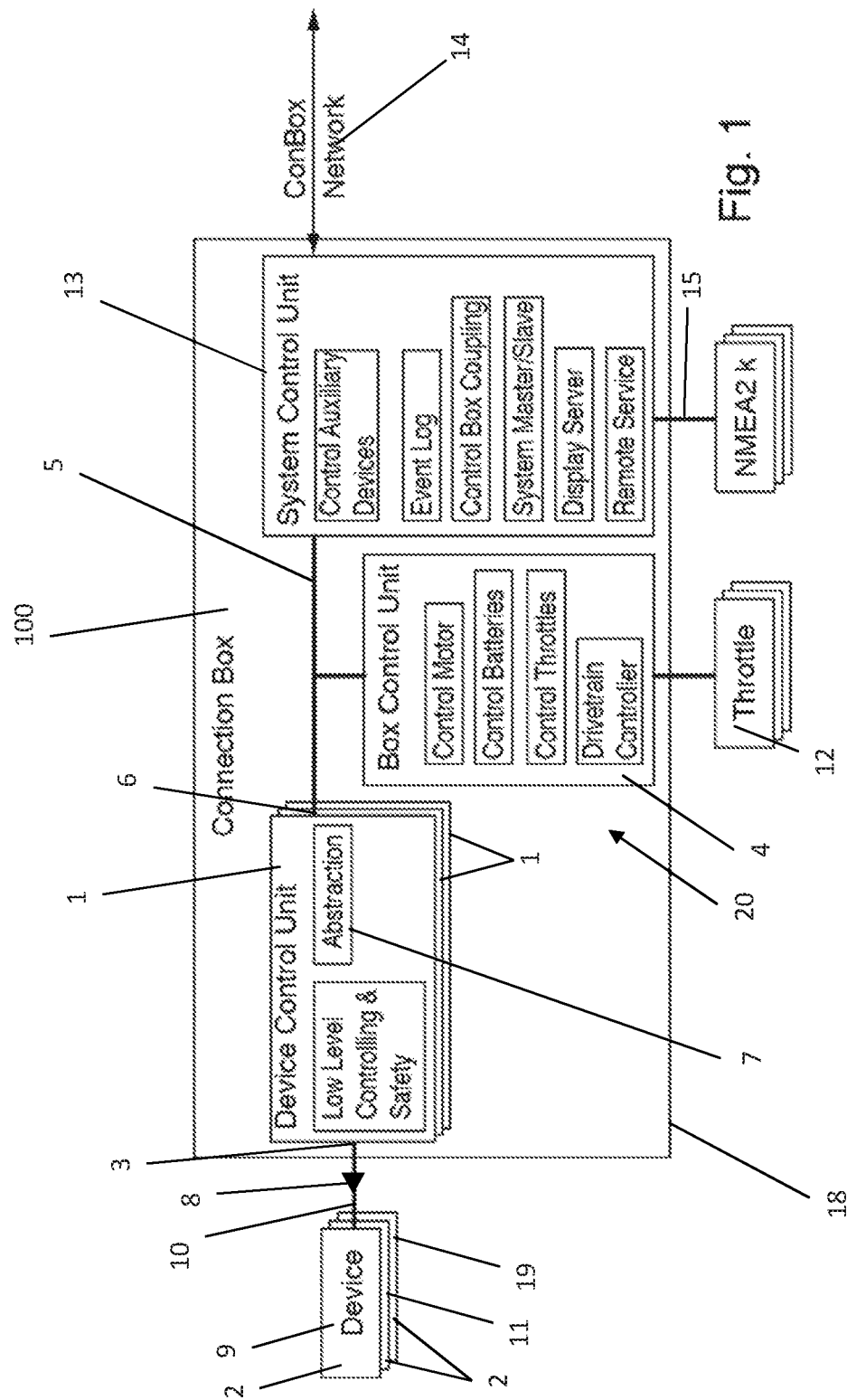
FIG. 1 is a schematic illustration of the system architecture described.

Exemplary embodiments will now be described with reference to the drawings. Those having ordinary skill in the art may be able to make alterations and modifications to what is described herein without departing from its spirit and scope. While the disclosed invention is susceptible of embodiment in many different forms, there is shown in the drawings and will herein be described in detail at least one preferred embodiment of the invention with the understanding that the present disclosure is to be considered as an exemplification of the principles of the invention and is not intended to limit the broad aspect of the invention to the embodiment illustrated. Therefore, it should be understood that what is illustrated is set forth only for the purposes of example and should not be taken as a limitation on the scope of the present invention. Identical, similar or similarly acting elements are provided with the same reference signs in the different drawings, and repeated description of these elements is in part dispensed with for the avoidance of redundancy.

The system is shown schematically in FIG. 1 wherein, in a connection unit 100 (Connection Box) at least one component controller 1 (Device Control Unit—DCU) is provided which is connectable to individual system components 2 (Device) via the component interface 3.

Furthermore, a connection unit controller 4 (Box Control Unit—BCU) is provided by means of which the component controllers 1 are organized in the connection unit 100 and can be controlled via the system bus 5 of a drive control 20.

In the component controller 1, aside from the hardware control system, an abstraction module 7 (Abstraction) is also provided which enables a representation of the specific system components 2 connected via the component interface 3 as a generic system component at the communication interface 6 to the system bus 5.

In the component controller 1, aside from the abstraction of the abstraction module 7 by means of which the system component 2 actually connected to the component controller 1 is abstracted to a generic system component, corresponding control signals are also output at the component interface 3 to the system component 2.

For example, at the component interface 3 of the component controller 1, on connection of a battery 9, a corresponding ignition voltage can be output in order to bring the battery 9 into the operating mode. For this purpose, for example, an ignition voltage of 12 V can be transferred to the battery 9 when the connection unit controller 4 transfers a request for switching on the battery 9 via the system bus 5 within the connection unit 100 to the component controller 1 to which the battery 9 is connected. With another battery type, however, the component controller 1 can be configured at its component interface 3 such that another ignition voltage which is suitable for the respective specific battery type is transferred or a different ignition signal or switch-on signal is transferred to the battery 9.

Furthermore, the component controller 1 can assume fundamental control functions and safety functions for the respective system component (Low Level Controlling and Safety).

By means of the component interface 3, a bus communication 10 can also be carried out with the system components 2 in order, by means of the component interface 3, also to enable data communication with the system components 2. This can be achieved, for example, through the provision of a CAN bus or by means of a serial bus such as UART or LIN or RS485 or RS232 or another bus which can be in communication with the respective system component 2.

The bus communication 10 with the system component 2 is independent of the communication of the component controller 1 with the system bus 5 by means of its communication interface 6. In other words, the system bus 5 is not in direct communication with the system components 2, but rather a data exchange takes place with the system components 2 only via the interposition of the component controller 1. A direct communication of the system components 2 with the system bus 6 is therefore not possible. Rather, the communication with the system components 2 from the standpoint of the system bus 5 takes place exclusively via the respective component controller 1.

The exemplary battery 9 transfers via the component interface 3, for example, its temperature, its charge level, the current discharging, the residual capacity or other parameters which can be of significance for the boat operation.

If, for example, an electric motor 11 is connected to the component controller 1 via the component interface 3, then the component interface 2 is connected to the power electronics of the motor and can accordingly provide the sensor signals which are provided by the power electronics to the communication interface 3 in a general form without the specific knowledge having to be passed on for the respective electric motor 11 on the system bus 5. In other words, for example, a rotary speed, a torque generated, the power, a temperature and other parameters can be transferred from the electric motor 11 via the component interface 3 to the component controller 1, which then abstracts the specific data and provides them generically by means of the communication interface 6.

Furthermore, in this case, it is possible by means of the component controller 1 to convert a corresponding drive command which is obtained from the connection unit controller 4 via the system bus 5 into a specific drive signal or operating signal for the specific power electronics of the respective electric motor 11 and to provide it via the component interface 3 of the respective power electronics. Accordingly, the component controller 1 can then instruct the power electronics to operate the specific electric motor 11 with the drive level pre-determined by the operator of the electric drive by means of the remote throttle lever.

Furthermore, in the component controller 1, dependent upon the system component 2 connected via the component interface 3, apart from the underlying control functions which are dependent on the connected system components 2, at the same time, fundamental safety functions are implemented for these specific system components 2. For example, on the basis of the knowledge of the respectively connected system component 2, for example an electric motor 11, then a current limitation, a torque limitation or a temperature limitation already in the component controller 1 can be implemented specifically for the system component connected. Accordingly, if a drive command is communicated by the connection unit controller 4, the component controller will take account of the pre-determined safety parameters and if necessary put the implemented safety functions into play and in this way avoid damage or overloading of the system components 2 connected.

In the component controller 1, in order to switch from system components 2 connected via the component interface 3, inter alia, current management components such as switches, fuses and current or voltage meters can be provided in order, in this way, to enable switching of the respective connected system components 2 to the required switching voltages or switching currents and on the other hand also to prevent, by means of a fuse, that system components 2 become damaged.

The connection unit controller 4 can serve as a master of the respective connection unit 100, and numbers and oversees the logical and, via the component controller 1, abstracted system components 2. If at least one abstracted battery 9, one abstracted motor 11 and one abstracted throttle handle are to be found, the connection unit controller 4 also provides the underlying functions for driving. In this way, the pure driving of the boat with an electric drive is possible in a simple, robust and error-reduced manner and the function can further be readily monitored. In this way, the targets regarding a rapid system start and rapid operability following the system start can also be achieved.

The connection box 100 in FIG. 1 comprises a plurality of component controllers 1, wherein the component controllers 1 and the connection unit controller 4 are accommodated together in a housing 18 of the connection unit 100.

Furthermore, in a connection unit 100, a system controller 13 (System Control Unit) can also be provided which, firstly, accepts the statuses and signals communicated via the system bus 5 and, secondly, also processes the information provided from the wider environment of the system or the boat. The system controller 13 can also, for example, undertake communication with a further connection unit 100 in order to be able to determine the corresponding overall system state, given the presence of more than one connection unit 100.

Accordingly, the system controller 13 can, for example, also transfer the entire system state to a central display unit, equalize the loading of different battery banks against one another, on use of charging devices, distribute the charging currents to the different battery banks efficiently and also balance the other loads that are present in the overall system, for example, auxiliary consumers and additional consumers which have nothing to do with the actual electric drive such that an efficient use of the system is achieved. Furthermore, by means of the system controller 13, the charging of batteries 9 in a hybrid system by means of a generator or the states which occur through the switching of a drive with an internal combustion engine in the electric drive system can be taken into account in the overall distribution and load balancing.

The system controller 13 is, firstly, connected to the system bus 5 which is provided in the connection unit 100 for communication of the component controllers 1 with the connection unit controller 4 and is connected via a network 14 to the further system controllers 13 which are provided in the respective system and, in particular, in other connection units 100. The system controller 13 can further also be connected to a whole-boat communication network, in particular a boat bus, for example, an NMEA2k bus 15 in order to be able simultaneously to receive information regarding further consumers or the environmental conditions into the representation of the system state or the prediction of ranges and other system states.

Figure 4:
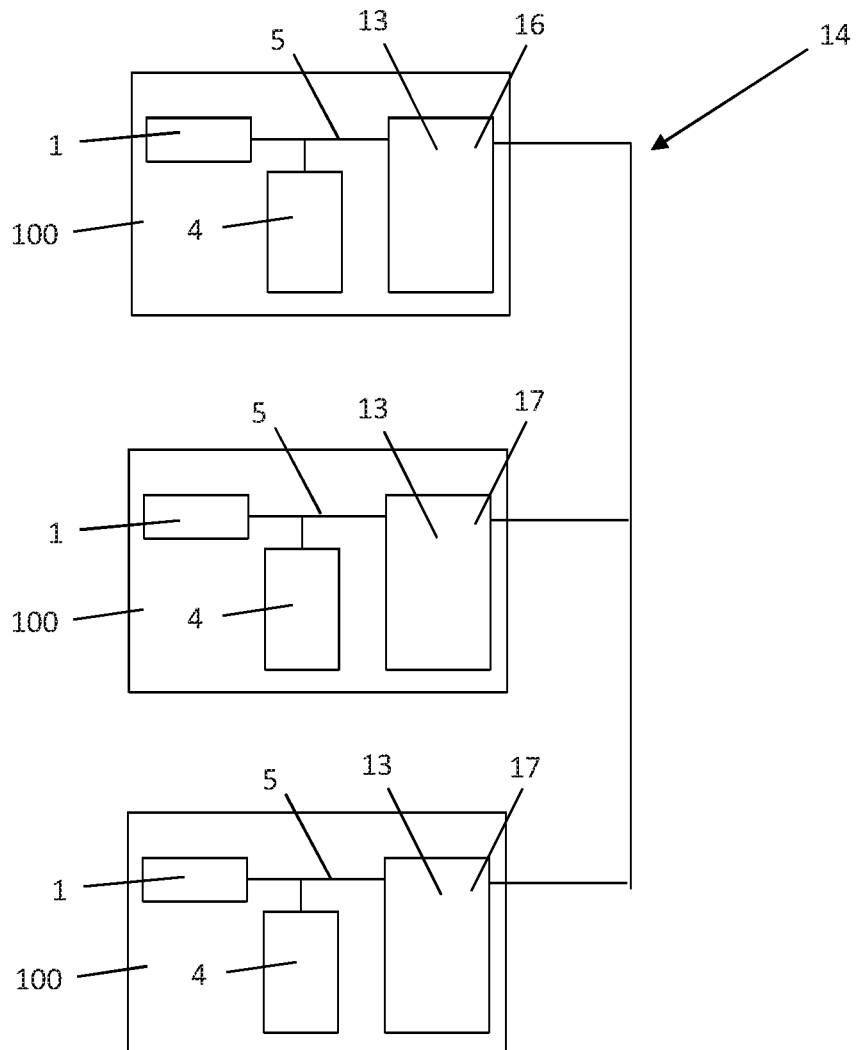
FIG. 4 is a schematic illustration of the system according to FIG. 1 comprising a plurality pf connection units.

A system according to FIG. 1 comprising a plurality of connection units 100 connected via the network 14 is shown in FIG. 4. The system controller 13 which is provided in each connection unit 100 forms, via the network 14 with other system controllers 13 of other connection units 100, a network 14 wherein only a single system controller 13 functions as master 16, whereas the other system controllers 13 function as slaves 17. In this way, a freely selectable scalability of the system is possible with a plurality of connection units 100.

The system controller, apart from the connection to the NMEA2k bus, correspondingly gathers the overall abstracted system component data and, in this way, can implement a system-wide energy management and bring together the individual connection units into an overall system.

The system controller 13 can accordingly develop a tree of system components 13 so that all the connection units 100 are coupled to one another into a complete system.

From a configuration file, the master 16 of the system controllers 13 detects how the respective connection units 100 are connected to one another and in the event of a system error, can make a decision such that particular contacts are made or broken.

Furthermore, the master system controller 16 can also implement and define an energy management strategy which is applied on the respective energy-generating devices and the energy-consuming components on board.

The master system controller 16 can also gather information and detect warnings and errors in order to react and to communicate them to the respective user or to incorporate them into the system event log.

Furthermore, a display server can be provided in the master system controller 16 which combines different displays that are provided in the system with one another and operate these as notification clients or display clients wherein different displays can also supply different representations on the basis of the same data. The master system controller 16 can also communicate with mobile hand-held devices, for example, a smartphone or a tablet in order also thereby to display system data.

Figure 3:
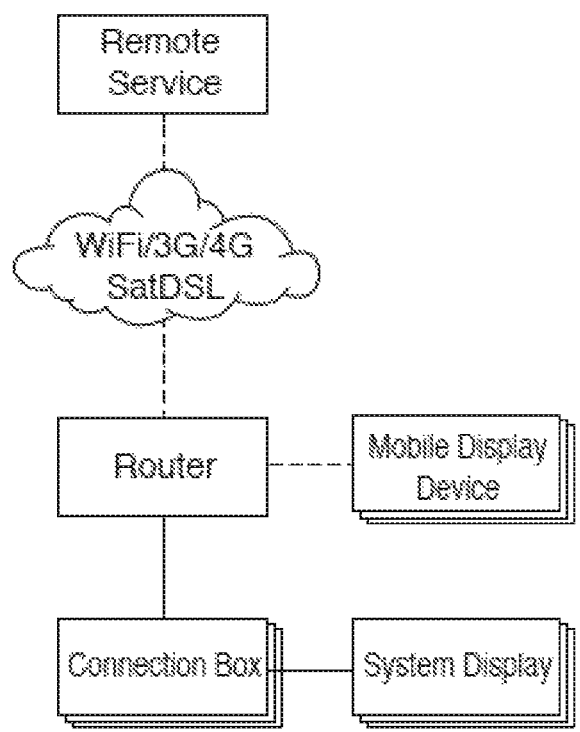
FIG. 3 is a schematic representation of a service access.

The master system controller 16 can further serve as a service access point wherein a service technician can log into the system by means of the master system controller 16, for example, via an encrypted channel, and find an error or upload software updates. A possible implementation is illustrated in FIG. 3.

With the construction of the connection unit on the basis of a plurality of component controllers 1 and a connection unit controller 4 in combination with a system controller 13, as compared with conventionally constructed systems in which each system component must be controlled individually, the number and length of the necessary cable connections can be significantly reduced. By means of the reduction of the cable connections, the reliability of the overall system can be further improved.

Preferably, the high voltage distribution is also provided in the connection unit or in a housing 18 structure accommodating the connection unit 100, wherein for example in a first layer of the connection unit controller 4, the component controller 1 and the system controller 13 can be provided and in a second layer, for example, the high voltage distribution can be arranged underneath the circuit boards forming the component controller 1, the connection unit controller 4 and the system controller 13.

With regard to the communication between the connection unit controller 4 and the component controllers 1, a system bus 5 is preferably provided, by means of which the abstracted system components can exchange information or the abstracted component information packets can be exchanged between the component interfaces 3 and the connection unit controllers 4. For this purpose, for example, a CANopen protocol or another standardized or proprietary protocol can be used.

In this way, also, the main structure for an emergency drive function can be provided, wherein for this a combination of component controllers 1 and connection unit controllers 4 are sufficiently provided in order to provide the emergency drive function. A communication for the emergency drive function takes place between the connection unit controller 4 to which, for example, a remote throttle handle 12 is connected, and at least one of the component controllers 1. The communication between the connection unit controller 13 and the component controller 1 takes place via the system bus 5 which is self-contained in relation to other communication partners of third parties.

The connection unit 100 with the component controllers 1, the connection unit controller 4 and also the system controller 13 can be provided self-contained in the connection unit 100 and can communicate via this system bus 5. Further components are not permitted herein, so that the bus 5 for communication between the component controllers 1, the connection unit controller 4 and the system controller 13 is occupied within the connection unit 100 exclusively by these components and no other components acting from outside, for example, from third party providers can communicate via this bus 5.

The communication between individual connection units 100 and, in particular, between the system controllers 13 of the individual connection units 100 can be created, for example, via an Ethernet connection.

The connections to the indicator displays and, for example, to multifunction displays (MFD), boat networks etc. are preferably also achieved via an Ethernet connection within the boat.

Both each component controller 1 and also each connection unit controller 4 and also each system controller 13 comprises its own microprocessor by means of which the corresponding applications can be processed and by means of which the communication via the corresponding buses can be handled.

Figure 2:
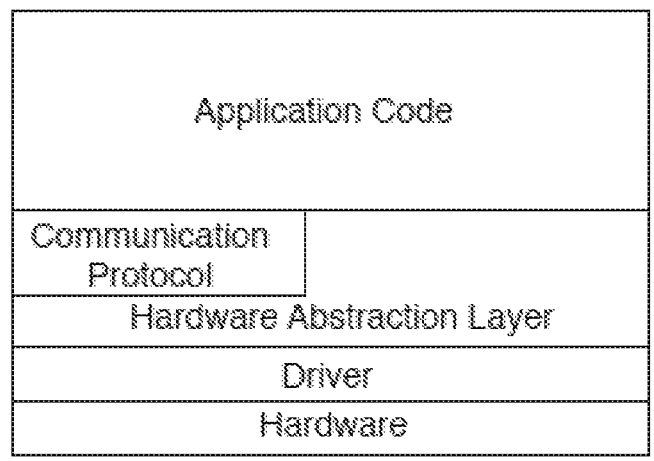
FIG. 2 is a schematic illustration of the layered structure of the implementation.

Regarding the structure of the implementation, as shown in FIG. 2, a layered structure is provided in which the code (Driver) of the component controller 1 is provided, in relation to the component interface 3 (Hardware) to which a component 2 of the electric drive can be connected, in a separate layer. The abstraction module 7 (Hardware Abstraction Layer) by means of which an abstraction of the specific control parameters and state parameters of the respective system components 2 is abstracted at the level of a generic system component, is also provided in a separate layer.

A delimitation of the individual layers between one another can be achieved in that the software is written as self-contained encapsulated classes without any direct coupling to a specific system component 2.

In order to be as flexible as possible, the software code is provided in a layered architecture. In the hardware abstraction layer, a simple Round Robin Scheduler is provided which makes it simple to carry out differently prioritized tasks.

The communication protocol (Communication Protocol) and the actual application code (Application Code) are furthermore fully decoupled from the specific hardware and also from the other layers.

Accordingly, a developer developing a specific system component 2 can focus, when constructing the system, on a reliable and safe implementation of this specific system component 2 and must not take account of the remainder of the system. Accordingly, highly complex systems with a large number of different system components 2 and a large number of auxiliary components can be safely constructed in a simple manner. Each detected system component results in an instance of the specific component class and is accordingly represented by the abstraction module as a logical system component or a generic system component on the internal CANopen bus.

The code is particularly preferably generated automatically on the basis of a corresponding design pattern and on the basis of a corresponding database in which all the component-specific data are included. Furthermore, the data for the component abstraction, the data types, the transfer objects and the component errors are defined in this database. Through the use of this database, all the changes and updates of component-specific data can be automatically incorporated and implemented in all hardware platforms and, in particular, in the component controllers and also the connection unit controllers 4 as well as the system controllers 13. In this way, the complexity that results from the distributed control structure can be reduced or eliminated since a central data definition is provided. Thus normally, an interface must be defined on both sides thereof. On the basis of the provision of the component controller 1 which provides via the abstraction module 7 an abstracted or generic system component, the system errors which typically occur due to the programming by different developers, can be reduced or prevented.

In other words, on the basis of a clear definition of the interfaces between the individual layers and a central storage of the definitions and generation of the code, a consistent and error-reduced or error-free system can be achieved.

Furthermore, on the basis of the distributed structure with the component controllers 1, the connection unit controller 4, the system controller 13 and the connection of different connection units 100 via the communication of the system controllers 13 to one another, by means of a central update function, new software or updated data can be transferred to all the controllers in the whole system, so that a consistent version is always present on the master system controller 16 and the slave system controllers 17.

The master system controller 16 and the slave system controllers 17 force the component controller 1 and the connection unit controllers 4 to implement the new software with the respective boat loaders and also, via the CAN-bus, to be supplied with the respective components or system components 2.

The system configuration per se can also be achieved by means of a central software distribution and, in particular, by means of a central file which is edited, for example, by the service technician and is then transferred to the master system controller 16 which then further distributes the data accordingly.

The GUIs and other user interfaces can be written, for example, using QT/QML, so that accordingly, they are portable across different platforms on the basis of the same code base.

The component controllers 1 are preferably provided in the form of separate hardware components, for example in the form of plug-in cards. For each of the specific physical system components which can be, for example, a battery 9, an electric motor 11, a generator 19, a converter or an internal combustion engine drive, a separate component controller 1 can be available.

Figure 5:
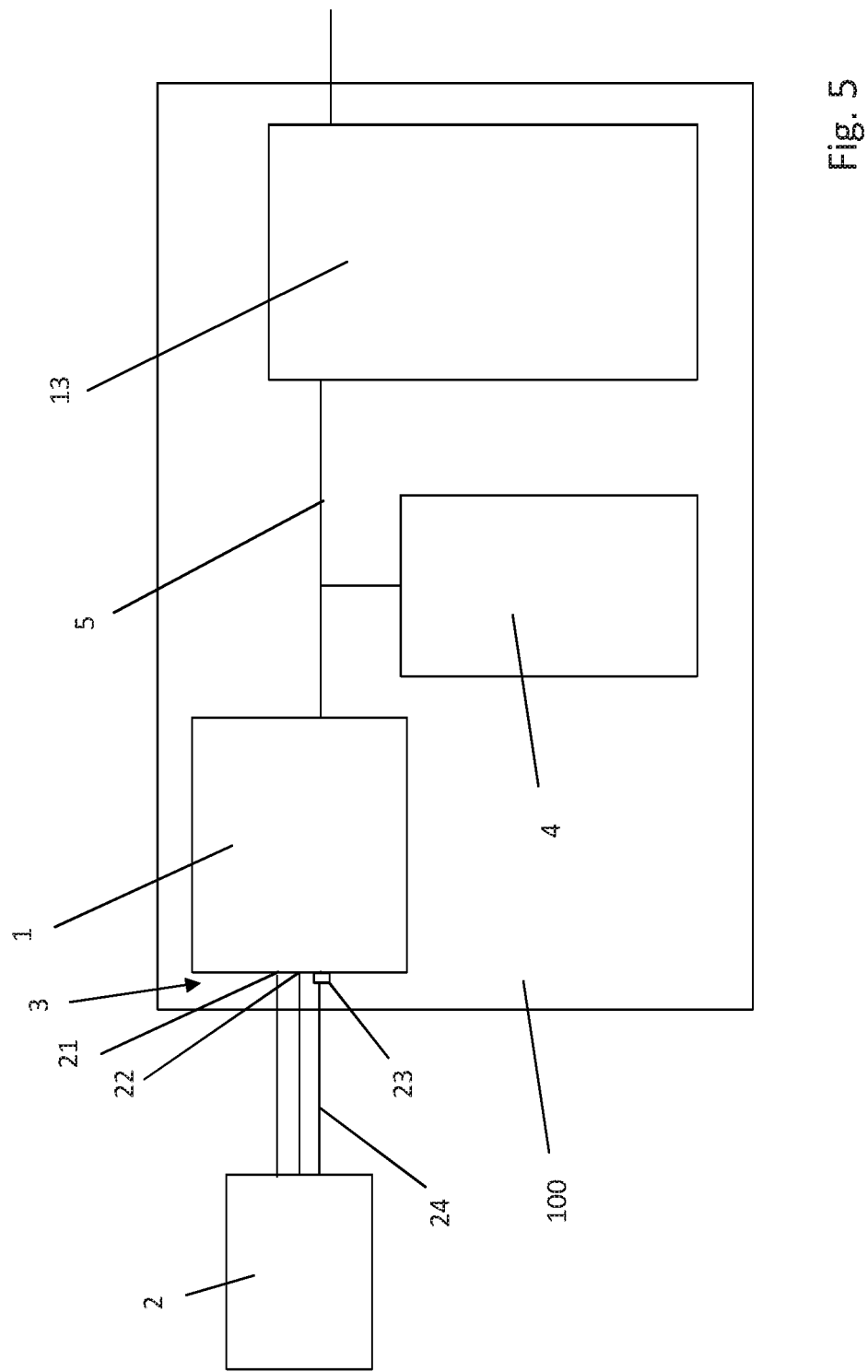
FIG. 5 is a schematic illustration of the system according to FIG. 1 in which a component interface of a component controller is shown in detail.

In FIG. 5, the system according to FIG. 1 is shown, wherein the component interface 3 of the component controller 1 comprises signal outputs 21 and sensor inputs 22 and bus interfaces 23 for communication with a bus 24 of the system component 2.

Figure 6:
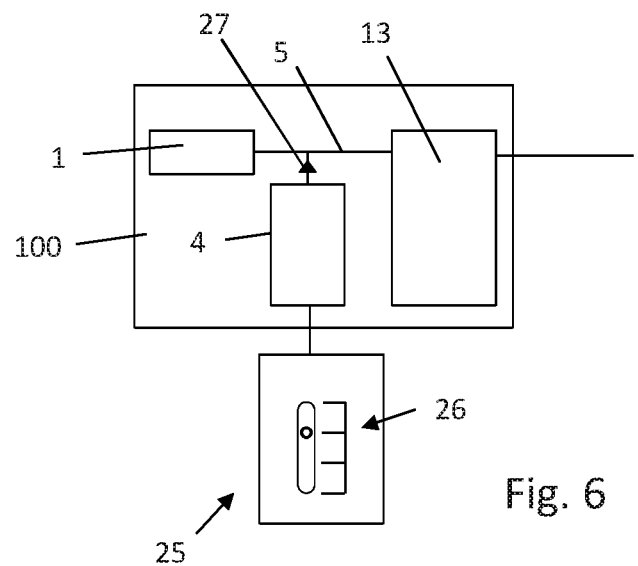
FIG. 6 is another schematic illustration of the system according to FIG. 1.

In FIG. 6, the system according to FIG. 1 is shown, wherein the connection unit controller 4 communicates with an input device 25 that specifies a drive level 26, and wherein the connection unit controller 4 controls according to the drive level 26 one or more component controllers 1 via the system bus 5 in order to achieve the drive level 26.

Thus, the connection unit controller 4 communicates with the component controller 1 via the system bus 5 such that the component controller 1 receives drive commands 27.

Figure 7:
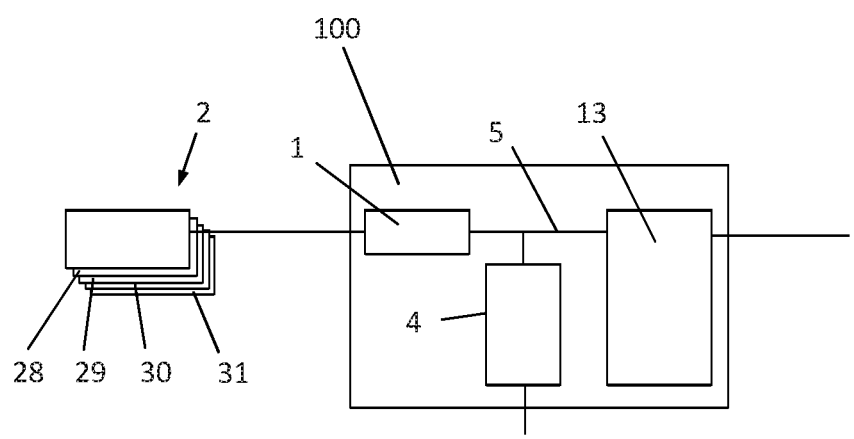
FIG. 7 is another schematic illustration of the system according to FIG. 1.

FIG. 7 shows The system of FIG. 1, wherein a plurality of system components 2 are connected to the component controller 1, wherein one system components comprise a charging device 28, a DC/DC converter 29, a DC/AC converter 30, a generator 19 (see FIG. 1), and an auxiliary aggregate 30.

Figure 8:
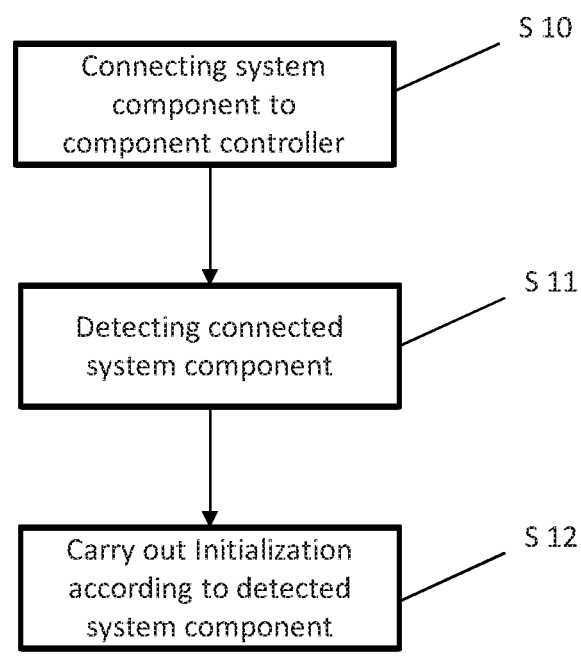
FIG. 8 is a schematic representation of the reaction of a component controller upon connection of a system component to its component interface.

FIG. 8 shows the reaction of a component controller 1 upon connection of a system component 2 to the component interface 3 (S 10). The component controller 1 detects the system component 2 (S 11) and carries out an initialization according to the respective connected system component (S 12).

As far as practicable, all the individual features which are described in the exemplary embodiments can be combined with one another and/or exchanged without departing from the scope of the invention.

The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The foregoing disclosure has been set forth merely to illustrate the invention and is not intended to be limiting. This disclosure is thus meant to be understood to include what is specifically illustrated and described above, what is conceptually equivalent, what can be obviously substituted, and also what incorporates the essential ideas. Since modifications of the disclosed embodiments incorporating the spirit and substance of the invention may occur to persons skilled in the art, the invention should be construed to include everything within the scope of the appended claims and equivalents thereof.

The scope of this description is indeed to be interpreted in conjunction with the appended claims and the claimed subject matter is what is intended to be patented.

What is claimed is:

1. A system for operating a boat equipped with an electric drive, the system comprising:
    a drive control that provides centralized control of system components via a system bus; and
    a component controller that communicates with the drive control via the system bus, the component controller including:
        a component interface that communicatively connects the component controller to a system component of the electric drive so as to enable data exchange between the component controller and the system component, wherein the system component exchanges data with the system bus only via the component controller, and wherein the data exchange comprises sending commands to the system component and receiving state parameters from the system component;
        a communication interface that communicatively connects the component controller to the system bus of the drive control,
        wherein the component controller receives at the communication interface control commands from the system bus in the form of percentage values of a percentage command range, and provides at the communication interface the state parameters in the form of percentage values of a percentage state parameter range, and
        wherein the component controller provides at the component interface the control commands in the form of absolute commands according to an absolute command range of the system component, and receives at the component interface state parameters in the form of absolute state parameters; and
        an abstraction module that, converts the percentage command values into absolute command values for the system component, and converts the absolute state parameters of the system component into percentage state parameters, based on the technical parameters of the system component when the system component.

2. The system of claim 1,
    wherein the component interface is a single component interface via which the system component and the alternate system component are connectable, one in exchange for the other, and
    wherein the component controller is configurable, dependent upon whether the system component or the alternate system component is connected, such that data exchange between the connected one of the system component or the alternate system component is represented as a generic system component.

3. The system of claim 1, wherein the component interface of the component controller comprises signal outputs and sensor inputs and bus interfaces for communication with a bus of the system component.

4. The system of claim 3, further comprising:
    a connection unit controller that communicates with the component controller via the system bus such that the component controller receives drive commands.

5. The system of claim 4, wherein the connection unit controller communicates with an input device that specifies a drive level, and wherein the connection unit controller controls according to the drive level one or more component controllers via the system bus in order to achieve the drive level.

6. The system of claim 5, wherein the connection unit controller combines at least two component controllers into a connection unit, and controls drive functions of the electric drive.

7. The system of claim 6, wherein the at least two component controllers and one connection unit controller are accommodated together in a housing of the connection unit.

8. The system of claim 4, wherein the connection unit controller combines at least two component controllers into a connection unit, and controls drive functions of the electric drive.

9. The system of claim 8, wherein the at least two component controllers and one connection unit controller are accommodated together in a housing of the connection unit.

10. The system of claim 1, wherein the component interface of the component controller comprises signal outputs and sensor inputs and bus interfaces for communication with a bus of the system component.

11. The system of claim 10, further comprising:
a connection unit controller that communicates with the component controller via the system bus such that the component controller receives drive commands.

12. The system of claim 11, wherein the connection unit controller communicates with an input device that specifies a drive level, and wherein the connection unit controller controls according to the drive level one or more component controllers via the system bus in order to achieve the drive level.

13. The system of claim 12, wherein the connection unit controller combines at least two component controllers into a connection unit, and controls drive functions of the electric drive.

14. The system of claim 13, wherein the at least two component controllers and one connection unit controller are accommodated together in a housing of the connection unit.

15. The system of claim 1, wherein the component controller further comprises:
at least two connection units, each connection unit including at least one component controller, a connection unit controller and a system controller,
wherein the system controllers of the connection units communicate with one another, and
wherein one of the system controllers is a master system controller, and all of the other system controllers are slave system controllers.

16. The system of claim 1, wherein the component controller detects the system component connected to the component interface, as distinguished from the alternate system component, and carries out an initialization according to the system component, such that, via the initialization, the component controller is adapted to the system component connected to the component interface by at least one of: corresponding parameterization, corresponding conversion tables for data communication, and corresponding internal wiring.

17. The system of claim 1, wherein the system component comprises one of: a battery, an electric motor, a charging device, a DC/DC converter, a DC/AC converter, a generator, and an auxiliary aggregate, and wherein the system component is connectable to the component controller.

18. The system of claim 1, wherein the absolute control commands are one of: a rotary speed stipulation, a torque stipulation, or a power stipulation.

* * * * *